May 24, 1955      H. G. TASKER      2,709,252
MULTI-PLANE TRACKING IN GROUND CONTROLLED APPROACH SYSTEM
Filed Aug. 20, 1948      4 Sheets-Sheet 1
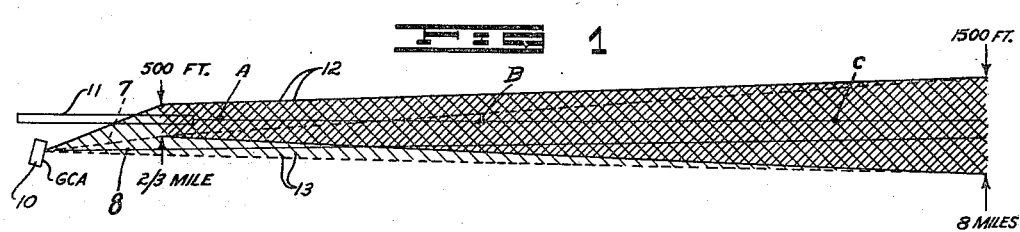
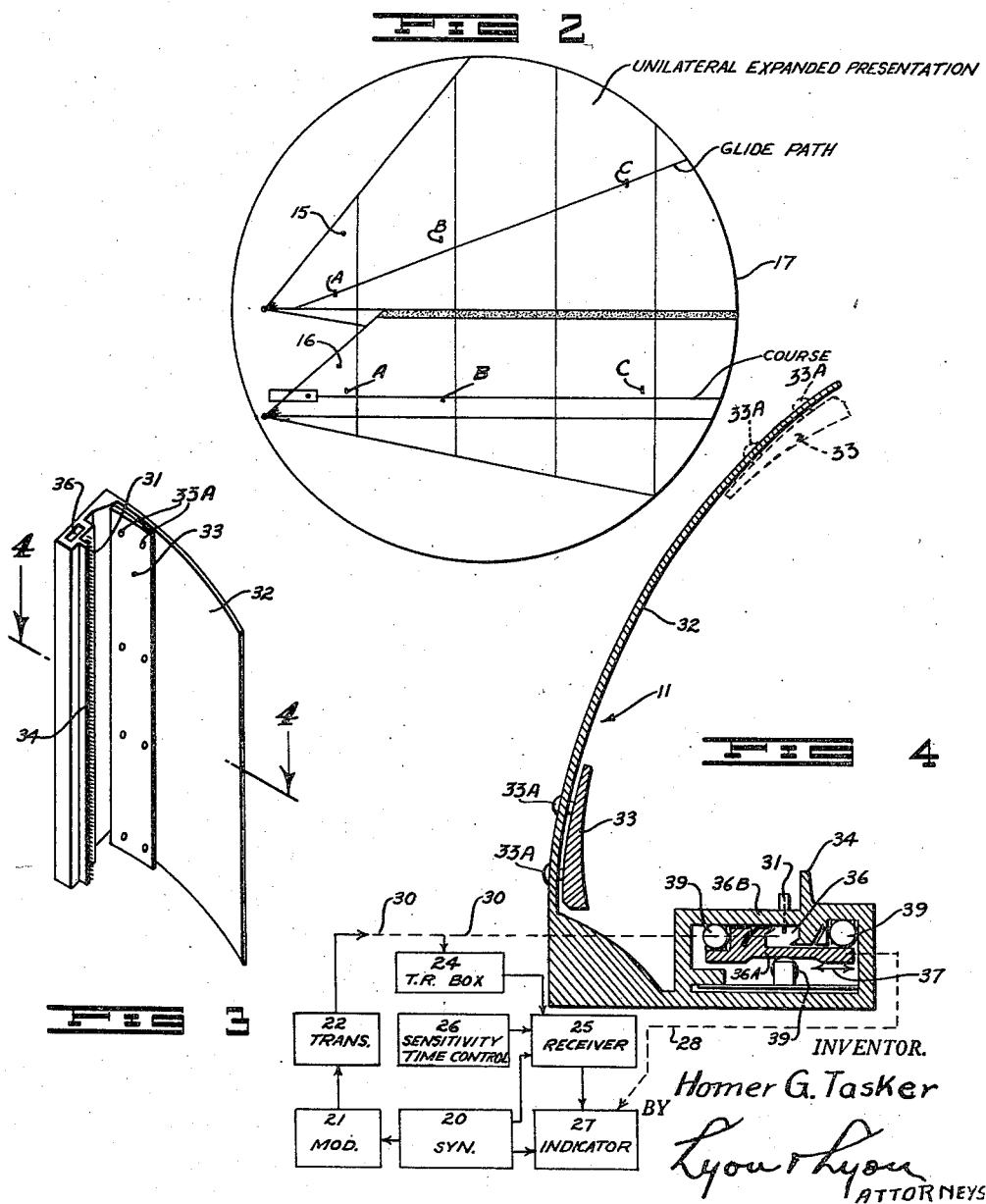
INVENTOR.
Homer G. Tasker
BY Lyon & Lyon
ATTORNEYS

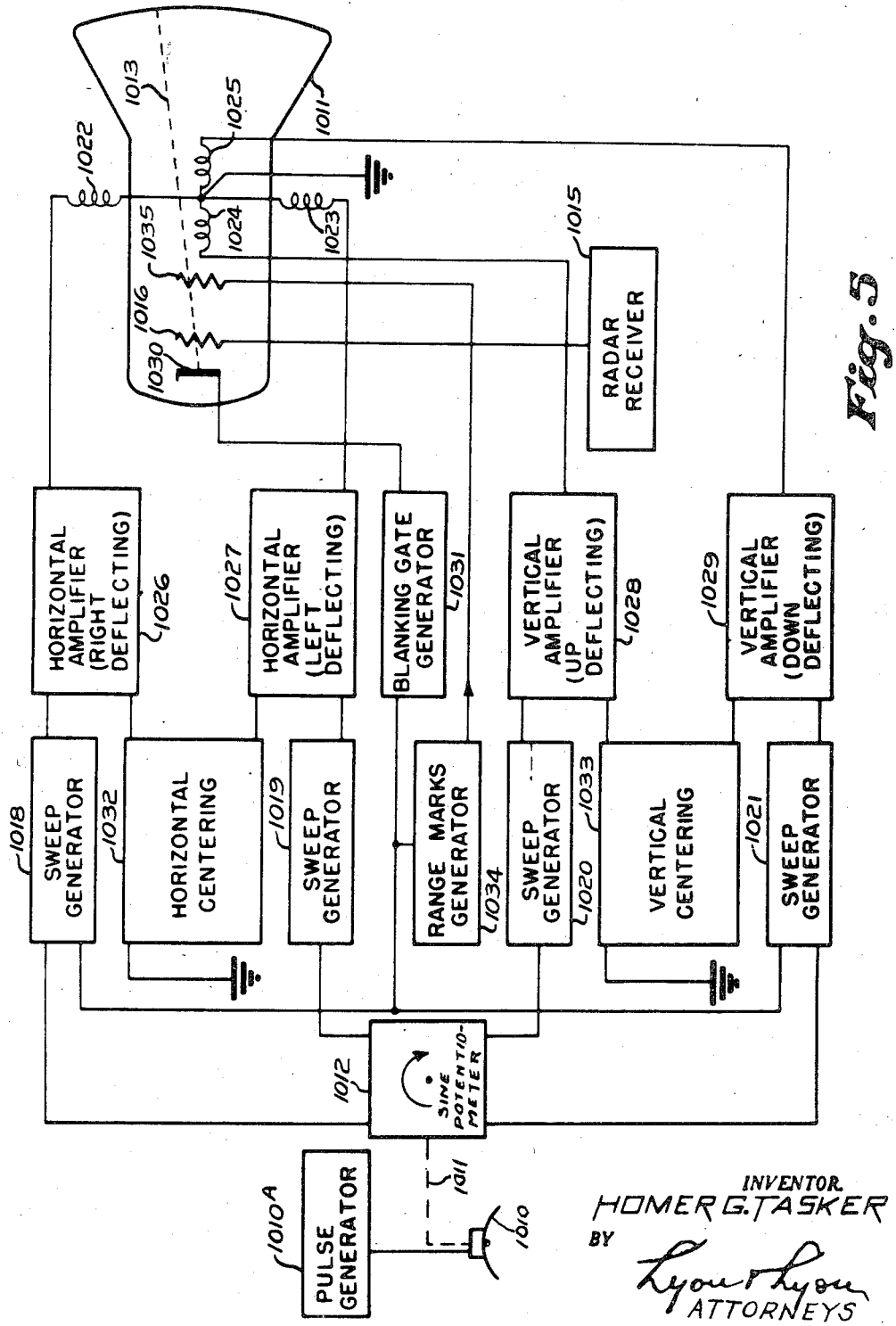

INVENTOR.
HOMER G. TASKER
BY
Lyon & Lyon
ATTORNEYS

United States Patent Office 2,709,252
Patented May 24, 1955

2,709,252

MULTI-PLANE TRACKING IN GROUND CONTROLLED APPROACH SYSTEM

Homer G. Tasker, Van Nuys, Calif., assignor to Gilfillan Bros., Inc., Los Angeles, Calif., a corporation of California Application August 20, 1948, Serial No. 45,238

10 Claims. (Cl. 343—11)

The present invention relates to radar systems of the ground control approach type for visually observing the flight of aircraft with respect to predetermined safe slide paths in landing operations under adverse conditions of visibility.

It is highly desirable to land aircraft safely without mishap under all conditions of impaired visibility including zero visibility whether occasioned by fog, rain, snow or blackout requirements. Safe landing of aircraft is desirably accomplished by use of radar equipment, all of which is preferably located on the ground instead of on the aircraft so as not to reduce its so-called pay load, and is accomplished by "talking down" the aircraft pilot by the use of a so-called ground control approach (GCA) system in which a person located on the ground communicates to the pilot by the usual radio communication circuit, information concerning the course of the aircraft's flight obtained from the use of such radar equipment. In GCA systems, such information is obtained by creating a visual picture of the instantaneous position of the aircraft in relationship to the landing strip on which it is to land, the instantaneous position being obtained by portraying on a cathode ray tube a first representation of the azimuth and range of the aircraft and on another or the same tube a second representation of the elevation and range of the same aircraft from which two representations the exact position of the aircraft in three dimensions with respect to the landing strip may be obtained.

Preferably, the relative positions of the aircraft with respect to its landing strip is portrayed in what I have termed "unilaterally expanded presentation" as fully set forth in my copending application Serial No. 680,604 filed July 1, 1946. In accordance with my previous invention, these representations are characteristically expanded and portrayed on a cathode ray scope. These presentations represent events occurring close to the airstrip where the radar apparatus is located and consequently because of the required definition of the planes with respect to surrounding objects, the ground control approach apparatus incorporates precision antennas arranged to project sharply defined beams both in azimuth and in elevation.

The intended results are satisfactorily obtained where the air traffic is not heavy such that only one plane at a time need be under control in the approach path. However, where the air traffic is heavy there is need of controlling two or more planes in the approach path, and there is great likelihood that tracking of one plane will be lost due to problems arising from the tracking of another plane. The term "approach path" used above is a predetermined desired path of flight extending from the desired touchdown point on the landing strip out to a predetermined point within the range of the precision antennas in a GCA system. As previously stated, a parabolic type of antenna is usually used for high definition but difficulties arise in the use of such antenna when large numbers of planes are landed, in order, in a short period of time since the field swept by such antenna, because of its location with respect to the landing strip, is poorly irradiated with energy in critical regions. This necessitates the bodily movement of the antenna as a unit by a servo mechanism which is automatically moved by an operator to follow movement of the plane being tracked. In such bodily movement of the antenna, in the last stages of the aircraft landing operation, it is practically impossible to see on the viewing scope any succeeding aircraft with the result that there is a great likelihood that proper information may not be given to such succeeding plane. Thus, the present day GCA system has some shortcomings which are especially objectionable when simultaneous automatic control of a plurality of aircraft is contemplated. In other words, it is highly desirable that each antenna not only radiate the required highly defined beam but that also the entire field of approach may be adequately covered without the necessity of bodily moving the antenna during the course of the flight of the aircraft whereby all of the planes in the approach path may be viewed all at the same time. This is particularly true of the so-called elevation antenna in the GCA systems used in determining the elevation of the aircraft in its flight path, but is not necessarily limited thereto and the same problem and solution is also applicable to the azimuth antenna.

It is further desirable to maintain the high degree of accuracy obtainable by the use of the improved indicating apparatus described and claimed in my above mentioned copending application, Serial Number 680,604 when the antenna apparatus is altered to produce the above mentioned desideratum, it being remembered that the antenna apparatus is coupled to the indicating apparatus so that a change in one necessarily affects the other.

It is therefore an object of the present invention to provide an improved GCA system in which a precision antenna in one of its positions is capable of presenting information as to the position of all aircraft in the approach path to the landing strip.

Another object of the present invention is to provide an improved ground controlled approach system capable of directing the landing of larger numbers of aircraft safely.

A further object of the present invention is to provide an improved ground controlled approach system in which the position of a plurality of aircraft may be accurately determined, using unilateral expansion, without movement of the precision type of antenna.

Still another object of the present invention is to provide an improved ground controlled approach system requiring a minimum number of operators for tracking and sending information to approaching aircraft.

Yet another object of the present invention is to provide an improved ground controlled approach system arranged to maintain the high degree of accuracy obtainable with the use of the indicating apparatus shown in my copending application, Serial No. 680,604 and yet observe the position of all aircraft in the approach path without moving the precision antenna which is coupled to the indicating apparatus.

Another object of the present invention is to provide a new method in a ground controlled approach system for simultaneously determining relative positions of aircraft linearly spaced along the complete approach path with but one antenna to thereby require but one GCA system instead of a plurality of GCA systems for the intended purpose.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows the location of the GCA equipment with respect to the aircraft landing strip as well as the desired and obtained field pattern, the equipment being located to one side of the landing strip for purposes of safety and for allowing a simultaneous view of all of the planes which are on or near the approach path.

Figure 2 shows the unilaterally expanded representations 15, 16 produced on the viewing surface of a cathode ray tube embodying the present invention wherein the position of the three linearly spaced aircraft A, B, C may be simultaneously observed on the range-elevation representation 15 without bodily moving the elevation antenna system as was heretofore necessary in GCA systems and also on the range azimuth representation 16.

Figure 3 is a perspective view of the precision elevation antenna system embodying a feature of the present invention.

Figure 4 is a sectional view taken on the line 4—4 of Figure 4 and shows the other component parts of the system in relationship thereto.

Figure 6:
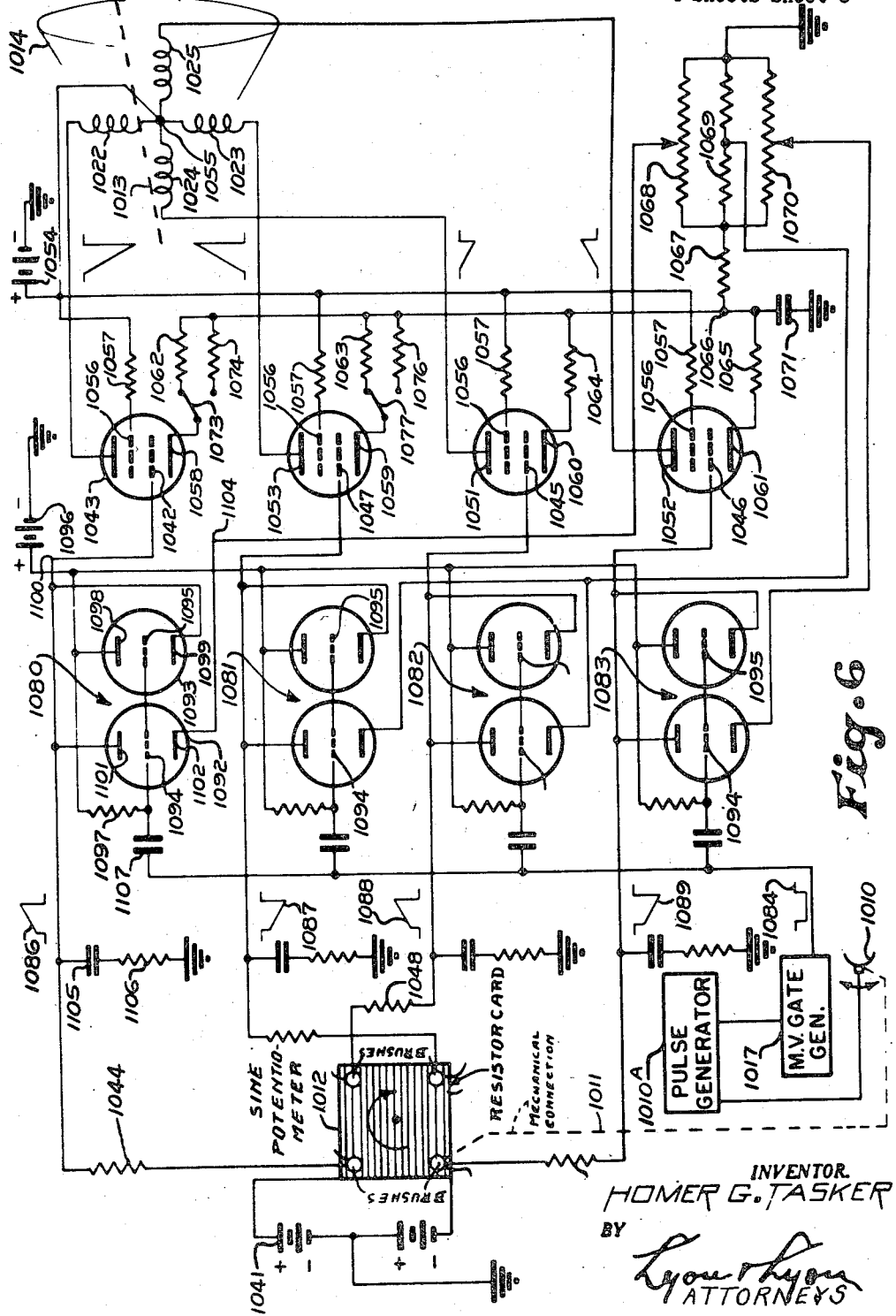

Figures 5–11, both inclusive, serve to illustrate means and techniques for producing unidirectional expansion in the cathode ray tube presentation as set forth in my copending application Serial No. 680,604, and these figures are described in detail hereinafter.

The ground control approach radar system shown in Figure 4 includes a signal timing and synchronizing unit or synchronizer 20, a modulator 21, a transmitting oscillator or transmitter 22, a precision elevation antenna 11, a transmit-receiver switch or TR box 24, a receiver 25, a sensitivity time control 26, an electrical measuring device or indicator 27 of which the cathode ray tube 17 forms a part. A synchronous tie 28, represented by the dotted line, exists between the indicator 27 and the antenna system 11 whereby the angular position of the cathode ray sweeps of the indicator are moved synchronously with the angular movement of the radiated beam.

The synchronizer or control timing and synchronizing unit 20 generates a pulse which is applied to the modulator 21 and is also applied to the electrical time measuring circuit of the indicator 27 to start such electrical time measuring circuit. Also, a pulse from the synchronizer 20 is applied to the sensitivity time control 26 whose output circuit is connected to the receiver 25 to control the intensity of signals translated by the receiver 25. In the GCA systems, other voltage wave forms generated in the synchronizer 20 are applied to the indicator 27 for range calibration, gating and blanking of the indicator between sweeps. The output of the modulator 21, preferably in the form of a keying pulse of high voltage D. C., is applied to the transmitter 22. It is essential that the timing circuit in the indicator 27 be started at the same instant that the transmitter 22 is pulsed with pulses from modulator 21 so that the elapsed time between the pulses applied from transmitter 22 to the antenna system 11 and the returning echo from the target may be measured accurately.

The modulator 21 is arranged to receive sharp trigger pulses from the synchronizer 20. These trigger pulses start the action of a circuit in the modulator 21 that has a precisely regulated period of operation. This modulator stage 21, often referred to as the transmitter driver, has its output applied to the transmitter 22 in the form of a sharp wave pulse of short duration. The transmitting oscillator 22 is of conventional type, preferably of the magnetron type to which are applied pulses from the modulator 21 to thereby effect a series of ultra high frequency oscillations which are fed to the antenna system 11. The antenna system 11 is connected to the output circuit of the transmitter 22 through a hollow wave guide represented by the dotted line 30. Since energy from the transmitter 22 to the antenna system 11 is conveyed in the form of recurrent pulses, the same antenna system is also used for the reception of the reflected pulses or echoes from a target during the time interval between pulses from transmitter 22 to the antenna system 11.

The antenna system 11 comprises a plurality of dipoles or half wave radiators located at the focus of a main reflector 32 and to a supplementary reflector 33 mounted on reflector 32. The reflector 32 has a half parabolic cross section but extends downwardly in a direction perpendicular to the paper in Figure 4 in the form of a cylinder with each cross section, of course, half parabolic. An array of dipole antennas 31 lie on a straight line which corresponds to the focus line of such reflector 32. Also mounted parallel with the line of antenna 31 is the primary reflector 34 which is located on one side of the dipoles 31, the other reflectors 32, 33 being mounted on the other side of the dipoles. It is noted that the supplementary reflector 33, shown in full lines, is releasably affixed by means of bolts 33A to the parabolic reflector 32 at a region thereon closest to the dipole antennas 31 when the GCA equipment is located relative to the air strip 11 as shown in Figure 1; the same reflector 33 being releasably mounted so that it may be removed from its full line position in Figure 4 to its dotted line position when the GCA equipment 10 is used on the other side of the air strip. In such case, the reflector 33 is not only moved to a further position from the dipoles 31 but is also reversed with its thicker edge most remote from the dipoles. Each one of the dipoles 31 forming the array extends downwardly into the variable cross section wave guide 36 which is in communication with the wave guide represented by the line 30 to extract energy therefrom.

The wave guide 36 may have its cross section altered by conventional means by reciprocating the bottom half 36A thereof in the direction indicated by the arrows 37 while the other portion of the wave guide 36B remains stationarily attached to the main reflector 32. Varying the cross section of the wave guide 36 changes the phase velocity of the transmitted waves to thereby cause the direction of the beam radiated from antennas 31 and reflected by the reflectors 32, 33 and 34 to change its direction in accordance with variations of the cross section. For this purpose, the movable portion 36A of the wave guide may be mounted for movement on the balls 39 and reciprocated in the directions indicated by the arrow 37; or more explicitly, the cross section of the wave guide 36 may be periodically altered by the arrangement shown in the copending application of Karl Allebach, Serial No. 49,910, filed September 18, 1948, now Patent No. 2,596,113.

Such movement of the wave guide portion 36A is converted by conventional synchronous tie means represented by the dotted line 28 to produce corresponding movement of a sweep produced in the indicator 27.

The TR box 24 serves to block the transmission of high powered pulses in the output circuit of the transmitter 22 from the input circuit or receiver 25.

Of importance is the fact that the supplementary reflector 33 is effective not only in the transmission of pulses but also in reception of the return echoes.

The operator of the search equipment of conventional GCA, which includes the conventional P. P. I. equipment, may place planes well within this zone shown in Figure 1 which is, for example, 1500 feet wide at 8 miles range after which pilots may fly their aircraft under guidance of the precision controller, within a zone which tapers from 1500 feet at 8 miles to 500 feet at two-thirds mile, as shown in Figure 1.

In Figure 1, the GCA equipment 10, including the precision elevation antenna system 11 (Figure 4) is mounted adjacent the aircraft landing strip 11. The area 12 represented by the hatched lines 12 slanting down to the left represents the coverage desired by the precision elevation antenna in the present system while the area represented by the hatched lines 13 extending downwardly and to the right represents the coverage obtained with such antenna structure embodying the present invention. It is noted that the area represented by the hatched lines 13 overlaps that represented by hatched lines 12 through the entire region including the critical region at which aircraft touchdown is desired and also at a distance of eight miles.

Figure 2 shows the unidirectionally expanded patterns 15, 16 obtained on the viewing surface of the cathode ray tube forming a part of the indicator system 27 as set forth hereinafter. In GCA systems, special problems are introduced since the scanning antenna must necessarily be located adjacent, not on, the landing strip for the approaching aircraft and since the antenna scanning means is coupled to the indicating means, the precision type of indicator 27 in such systems not only must accurately represent the position of an aircraft at, for example, eight miles from the landing strip, but, most important, must accurately represent the position of such aircraft near touchdown on the landing strip. Such accurate positions are obtained by the use of sharply directed beams and by the use of a unilaterally expanded pattern.

The problem existing heretofore is made more manifest in Figure 2. In present day GCA systems the precision elevation antenna system 11 must be moved around bodily to follow the incoming linearly spaced aircraft due to the narrowness of the beam in azimuth and the displacement of the equipment at one side of the runway. When the beam is narrow, as represented by the area between radial lines 7 and 8 in Figure 1 and is set to observe, for example, aircraft "B" then aircraft A in a critical region is not observed; or when such beam is rotated to observe the position of A, then aircraft B and C are not observed simultaneously.

One solution heretofore considered is to widen the elevation beam so that it covers the entire approach zone extending out from touchdown, a typical distance of eight miles. However, this requires a large additional amount of transmitted power to offset the spread of energy and results in the appearance of undesirable signals or echoes on the tube face 17 from ground objects in the increased irradiated zone. The second mentioned objection might not always be serious, i. e., there may be some air fields, and some directions at many air fields, where ground clutter on the elevation scope is not too serious. Nevertheless, the elevation beam preferably has an azimuth width as small as may be achieved and still meet other requirements. This is accomplished by the structural arrangement shown in Figures 3 and 4 which is described hereinabove. Of importance is the fact that the beam from the antenna system 11 used to cover the shaded area represented by the hatching lines 13 is unsymmetrical about the axis in which its intensity is greatest and has a characteristic unsymmetrical portion thereof extending azimuthally, laterally or transversely in the direction of the landing strip from which the antenna system is displaced. For purposes of definition, the term "projection axis" as used herein is intended to mean such aforementioned axis or direction in which the intensity is greatest. Furthermore, in accordance with the present invention, not only is the beam projected from the antenna system 11 provided with such characteristic portion extending in such azimuthal direction, but, also, the representations obtained by unilaterally expanding in azimuth the pattern obtained by the sweeps which are synchronized with movement of such beam both contribute mutually to produce an improved ground controlled approach system. In other words, the present invention resides not only in the improved antenna system but also in the combination of such system with the expanded plan position indication system described and claimed in my above mentioned copending application Serial No. 680,604.

While the novel precision antenna arrangement is described in connection with representations obtained on a cathode ray tube, the present invention, in its broader aspects, is not limited thereto for the novel antenna system may be used to transmit control pulses to all aircraft along the approach path to control an automatic pilot in the aircraft or the reflected pulses from such aircraft may be used to actuate controls or signals located adjacent the GCA system. In other words, the new antenna arrangement may be used in automatic GCA systems.

An important feature in the antenna structure is that a substantial length of the profile of the main reflector lies on a parabolic curve with the profile of the supplementary reflector not on such parabolic curve. Also, while the supplementary reflector is preferably releasably attached to the main parabolic reflector, certain phases of the present invention may be practiced when the supplementary reflector is integrally formed with the main reflector, as in a casting or molding process.

For a more detail description of the means and techniques used for developing unidirectional expansion in the cathode ray tube display, reference is now made to Figures 5–11, both inclusive, and the following description, all of which appears in my aforementioned pending application Serial No. 680,604.

Figure 5 is a block diagram and Figure 6 is a schematic representation of apparatus for accomplishing the aforementioned results.

Figures 7, 8, 9, 10 and 11 are graphic representations helpful in explaining certain features of the present invention.

Figure 7:
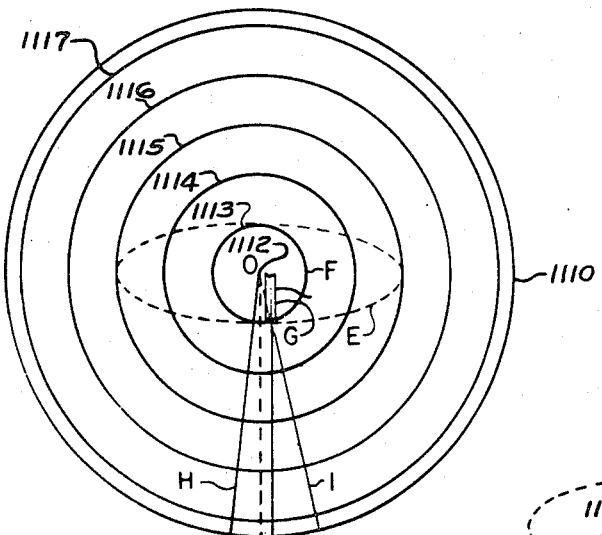

Figure 7 shows a representation obtained by the use of a conventional P. P. I. such as is used in the so-called "search" portion of GCA equipment of the type to which the present invention has specific application. In Figure 7, the series of concentric circles is the loci for points of constant distance from the center and are known as range marks. The outer circular line is not a so-called range mark but is a representation of the outer circumference of the cathode ray tube. The elongated elliptically-shaped range mark E corresponds to range mark F when the P. P. I. is modified in accordance with the present invention.

Figure 8:
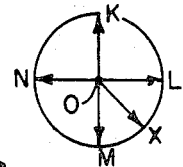

Figure 8 illustrates the four sweep vectors ON, OK, OL and OM in a conventional P. P. I. which vary in magnitude between zero and a mutually equal magnitude in timed relationship to produce the resultant which at any one particular instant is represented by the generalized vector OX, as is described more fully below. These four vectors ON, OK, OL and OM in quadrature and of equal maximum intensities may be produced respectively by individual ones of four equally circumferentially spaced cathode ray deflecting means acting alone, the arrows on such vectors indicating both the fixed direction of the vector and the direction in which the cathode ray beam tends to be moved. These four vectors in a P. P. I. system are in quadrature and are varied in magnitude with respect to time to produce the rotating vector OX of constant length thereby to define circles corresponding to the circular range marks shown in Figure 7. It is understood, of course, that such range marks are produced by intensifying the cathode ray beam at predetermined equal time intervals when such beam is being moved outwardly in production of a sweep. This form of picture making by the rotating vector OX in a P. P. I. may be likened to a map expressed in polar coordinates where a point on such map may be represented by the conventional polar coordinates $\rho$ (rho) and $\theta$ (theta) wherein $\theta$ is the azimuth angle at which a radar antenna beam is being directed and where $\rho$ is directly proportional to the range or distance to such point.

In the conventional P. P. I. pattern shown in Figure 7, the aircraft landing strip G and the two radial lines H and I are, for purposes of analysis and orientation, superposed to indicate the sector defined by HOI, which is to be expanded in accordance with the present invention in a direction perpendicular to line OJ to thereby achieve some of the important results of the present invention. Such sector HOI, in accordance with prior art practice, is expanded by the use of a so-called "B" scope as mentioned above.

Figure 9:
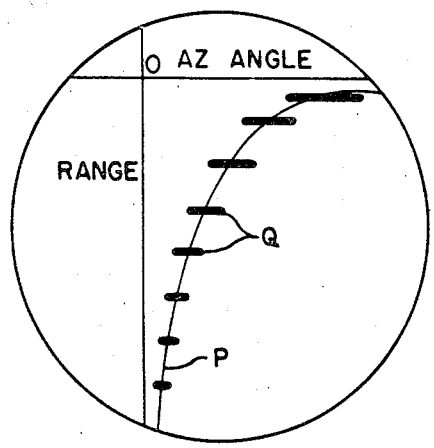

Figure 9 shows a representation obtained by the use of prior art "B" scope equipment when the sector HOI mentioned above is expanded. In Figure 9, superposed on the curved line P representing the actual straight line glide path of aircraft is a series of horizontal lines Q increasing in length in horizontal direction, such horizontal lines Q representing the instantaneous position of the aircraft on its safe straight line glide path. In Figure 9, the abscissa of the curve P represents the azimuth angle to the approaching aircraft from the point 1000 or origin O where the radar equipment is placed and the ordinates of such curve P represent the range of such aircraft from the point where the radar equipment is placed.

Figure 10:
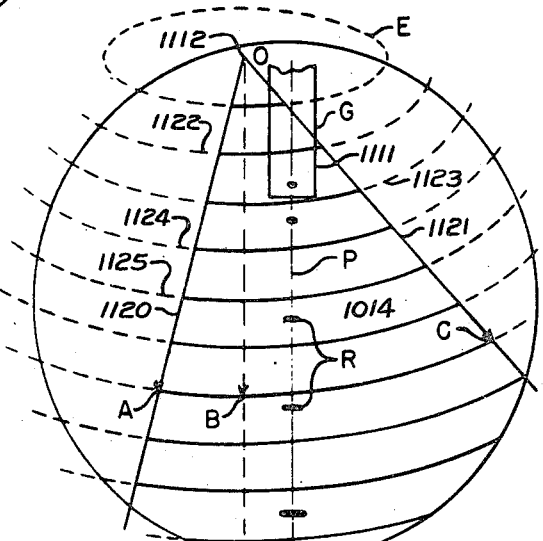

Figure 10 shows a representation obtained on a cathode ray tube incorporating the present invention when the sector HOI mentioned above is expanded; that is, Figure 10 is related to Figure 7 in the sense that the sector HOI obtained by use of conventional P. P. I. is expanded and displaced on the cathode ray tube as indicated by the sector AOC in Figure 10. In Figure 10, the partially full lines and partially dotted curved lines forming extensions of corresponding full lines represent the loci of points of constant range from the point or origin O which corresponds to the point where the radar equipment is located. It is noted also that the electrical adjusted center of the cathode ray tube is adjusted to a point near the outer boundary of the tube to thereby make more efficient use of the tube.

Figure 11:
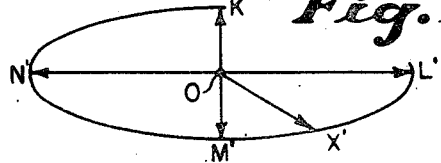

Figure 11 is related to Figure 10 in that the four vectors ON', OK', OL' and OM', each acting constantly in the directions indicated, but with intensities varying from zero to their maximum values indicated in Figure 10, are utilized to obtain at one particular instant the resultant vector OX' the angular position and length (intensity) of which vector OX' varies in time. These four vectors ON', OK', OL' and OM' in quadrature may be produced respectively by individual ones of four equally circumferentially spaced cathode ray deflecting means acting alone, the arrows on such vectors indicating both the constant direction of the vector and the direction in which the cathode ray beam tends to be moved thereby to produce the sweep vector OX'. These four vectors in quadrature are varied in magnitude with respect to time to produce the rotating vector OX' of variable length thereby to define elongated figures such as the elongated or elliptical range marks shown in Figure 10.

Since, in the particular system described, there are two antenna scanning beams, i. e., one for azimuth information and one for elevation information, and since these scan respectively through angles of 20° and 7°, it becomes highly desirable to pivot or move generally laterally to a relatively large degree the sweeps of the synchronized cathode ray beam in order to permit more accurate observation. Azimuth positions of the approaching aircraft are obtained by causing the respective cathode ray sweeps to scan the cathode ray tube in synchronism with the azimuth radar antenna beam scan. The elevation indicating system is basically the same as the azimuth indicating system but for the elevation antenna scanning in a vertical plane instead of a horizontal plane, and for that reason only the azimuth indicating system is described in detail below.

One of the important features of the present invention is the particular manner in which the sweeps of the synchronized cathode ray beams are expanded; i. e., pivoted or moved generally laterally during which the angular position of the sweep and its length is changed. Although the azimuth indicator sweep which would normally scan through 20° is expanded three times, thus making the included angle of the representation on the cathode ray tube in the order of 60°, the particular type of expansion in each case is not direct angular expansion but is of the type described in connection with Figure 11. The expansion of the sweeps is of such nature that a presentation results having what I term "unidirectional expansion" or "unidirectional magnification."

Such "unidirectional expansion" or "unidirectional magnification" may be likened or comparable to drawing a number of lines on a sheet of rubber, some horizontal, some vertical, and some at an angle, and then stretching the rubber sheet in a horizontal direction, meanwhile holding the vertical dimension constant. In such case, vertical lines have their lengths unchanged and are still parallel and straight, but their horizontal spacing is increased in proportion to the amount of the stretch. Also, the horizontal lines increase in length, but remain parallel and straight, and the slopes of the angular lines are reduced but they remain straight.

The expansion, i. e., radial or generally lateral movement, of the sweeps to produce such unidirectional expansion or unidirectional magnification is of a hyperbolic type; that is, the expansion, i. e., pivoting or generally lateral movement, of the sweep is occasioned not only by moving the sweep (vector) angularly but also simultaneously changing its magnitude. Each sweep may be considered as a vector having a fixed center or origin from which all vectors radiate. When a vector of constant length is rotated, i. e., changed in a direction perpendicular to its length, it is said to vary in accordance with a trigonometric function such as a sine or cosine function; but when the vector is changed in the direction of its length and also rotated, it is said to move in accordance with a hyperbolic function. A sweep in a conventional P. P. I. system is rotated without changing its length and without changing in accordance with a hyperbolic function. But, in accordance with the present invention, the sweep is changed appreciably in the direction of its length in a predetermined manner in accordance with a hyperbolic function to produce new results. Briefly, in accordance with certain aspects of the present invention, radar equipment is used to scan space through an angle $\theta$, and synchronously therewith a cathode ray sweep is varied in accordance with a trigonometric function of $n\theta$ where small $n$ stands for a number greater than one and simultaneously the length of such sweep is periodically varied in accordance with a hyperbolic function of $n\theta$, the particular relationship between the trigonometric function and the hyperbolic function being ascertained in accordance with the principles set forth in the article entitled "Complex Angles" by Aram Boyajian on pages 155–164 of Journal 42 of the American Institute of Electrical Engineers, February 1923.

This difference is shown in comparing Figures 7 and 10 where, in Figure 7, the cathode ray sweeps rotate about the center without changing their lengths to define the solid line concentric circles which are the loci of points of constant distance as in a conventional P. P. I. system. But, in Figure 10, the cathode ray sweeps are not only changed angularly but in length as well to define the solid series of curved lines which form part of an elongated figure resembling ellipses shown partly in Figure 10 and as a complete dotted elongated figure E in Figure 7. Such dotted elongated figure in Figure 7 and curved full lines in Figure 10 are the loci of points of constant distance from the center in a system producing the desired type of expansion. In such case, it is seen that the sweep or vector OA is longer in the position shown than when it is moved to the position OB, the sweep OA being movable both angularly and "stretched" in the direction of its length to produce an area defined by AOC which is expanded unidirectionally in a direction perpendicular to the direction indicated by line OB. It is observed that the time of travel of each sweep, although some are longer than others, is the same; and since time is proportional to distance, so far as transmitted and reflected radar pulses are concerned, lengthening the sweeps corresponds, on the cathode ray tube, to lengthening the distance traveled by the corresponding radar pulse. Accordingly, the width of the landing strip G (Figure 7) appears to be enlarged as in Figure 10.

While the path ABC traced by the extremity of vector OA is curved to the extent shown, it is within the scope of the present invention to provide more or less curvature to the path or line ABC and in fact to make line ABC substantially straight. This variation in curvature of the line ABC may be controlled by such means described later and in particular by varying the position of the switch elements 1073 and/or 1077 to thereby vary the amplification of the sweep voltages applied to the deflection coils of the cathode ray tube.

While the apparatus described is shown for obtaining a presentation of azimuth and range information, it is evident that the same apparatus may be used in duplicate to obtain a presentation of elevation and range information. When used to obtain such elevation and range information, the radar antenna scan beam is oscillated in quadrature to the direction it oscillates when azimuth and range information is being obtained.

In Figure 5, the radar antenna 1010, arranged to oscillate in a horizontal plane through, for example, an angle of 20° in order to obtain azimuth-range information, is mechanically connected by mechanical connection 1011 to impart synchronous movement to the sine potentiometer 1012 and when a pulse of radiation from the pulse generator 1010A leaves the antenna 1010 the beam 1013 of the cathode ray tube 1014 is caused to leave the adjusted electrical center of the tube 1014 traveling in the same corresponding direction as the pulse of radiation to produce a sweep. During this interval in which the sweep is being produced, the intensity of the beam is quite low, being barely visible on the face of the scope. Sometime later, the transmitted pulse reflected from an aircraft returns as an echo and is received on radar receiver 1015, the output of which is connected to cathode ray grid 1016 to thereby intensify the beam 1013 and to leave a spot on the tube 1014, the distance to such spot from the adjusted electrical center being dependent upon the range or distance of the aircraft from the radar equipment and also upon the position of the aircraft with respect to the antenna. After completion of the sweep, the beam 1013 returns to the adjusted electrical center of the tube 1014 and waits for the next pulse of radiation to leave.

Sweeps of beam 1013 occur in synchronism with the energy pulses transmitted to antenna 1010; that is, the synchronizer, timing unit or multivibrator (MV) gate generator 1017 (Figure 6) transmits separate triggering pulses to both the pulse generator 1010–A and to genertors 1018, 1019, 1020 and 1021 in timed relation. A pulse from generator 1017 applied to the sweep generators 1018, 1019, 1020 and 1021 causes the generation of a so-called saw-tooth energy pulse which causes the cathode beam 1013 to be deflected outwardly from its adjusted electrical center and to cause a corresponding trace on the cathode ray tube, i. e., a sweep. In order to prevent traces of the cathode ray beam when and as it returns from such outwardly deflected position to its adjusted electrical center, the cathode ray tube is what is termed "blanked out" by a potential applied to tube cathode 1030 from blanking gate generator 1031 which is operated in predetermined time sequence by potential applied thereto from the sweep generators 1018 and 1021.

There are two fundamental requiremens in the operation of the system shown in Figure 5, i. e., (1) a sweep must start out slightly earlier than each pulse of radiation, and (2) the sweep must have an angular direction corresponding to the direction of the transmitted antenna pulse. The first requirement is met by the apparatus outlined above, some of which is described in detail later, and the second of these requirements is met by the function of the mechanically rotated sine potentiometer 1012 from which currents are eventually applied to each of the magnetic deflecting coils 1022, 1023, 1024, 1025 to produce an angularly variable magnetic field in tube 1013 in synchronism with the angular movement of the antenna scanning beam.

The electrical center of the beam may be adjusted by adjustment of the horizontal centering means 1032 and vertical centering means 1033 which both serve to adjust the amount of continuous or direct current flowing in the magnetic deflecting coils 1022, 1023, 1024 and 1025.

In order to provide suitable range reference marks on the cathode ray tube 1014, a range mark generator 1034 controls the potential of cathode ray tube grid 1035, the range mark generator 1034 being synchronized by voltages obtained from the pulse generator in sweep generators 1018, 1021 and its effect on grid 1035 being blanked out during the return stroke of the cathode beam 1013 by a control voltage obtained from blanking generator 1031.

Referring to Figure 5, the sine wave potentiometer 1012 is connected so that it provides potentials which are fed through the so-called "double-ended" saw-tooth or sweep generators 1018, 1019, 1020, 1021 to produce a rotating magnetic field in the tube 1014. The potentials on the pairs of brushes 1036, 1037 and 1038, 1039 (Figure 6) vary as the resistor card 1040 is rotated. The resistor card 1040 may be of conventional design having 500 to 800 turns and so mounted that the four brushes 1036, 1037 and 1038, 1039 located on a circle and spaced 90° apart may be rotated with respect thereto. The so-called outside terminals of the potentiometer card 1040 are connected to opposite terminals of continuous voltage source 1041 which has its center tap grounded.

Brush 1036 is connected directly to the main control grip 1042 of electron discharge device 1043 through the serially connected brush filter resistance 1044 while in similar fashion the other brushes 1037, 1038 and 1039 are connected respectively to main control grids 1045, 1046 and 1047 of devices 1051, 1052 and 1053 through brush filter resistances 1048, 1049 and 1050 respectively.

Each of the devices 1043, 1051, 1052 and 1053 may be of the beam power type such as the 6L6 and are connected to supply large currents in amplified form respectively to magnetic field windings 1022, 1024, 1025 and 1023 which are serially connected in the respective anode circuits.

Space current for each of the devices 1043, 1051, 1052 and 1053 is supplied from a common continuous voltage source 1054 having its negative terminal grounded and its positive terminal connected not only to the common junction point 1055 of the windings 1022, 1023, 1024 and 1025 but also to the four separate screen electrodes 1056 through respective voltage dropping resistance 1057. The continuous space current path for each of the devices 1043, 1051, 1052 and 1053 is completed by connecting cathodes 1058, 1059, 1060 and 1061 in a series circuit respectively with resistances 1062, 1063, 1064 and 1065 and connecting the common junction point 1066 of resistances 1062, 1063, 1064 and 1065 to ground through the series circuit comprising resistance 1067 and the three mutually parallel connected tapped resistances 1068, 1069 and 1070, it being noted that bypass condenser 1071 connected between ground and junction point 1066 maintains point 1066 at substantially ground potential for currents in the range of radio frequencies involved herein.

It is noted further that the cathode 1058 may be selectively connected by switch 1073 to either resistance 1062 or to the unconnected terminal of resistance 1074 which has its other terminal connected to point 1066 to thereby provide an adjustable control of the amplification resulting from the use of device 1043. In similar fashion, in order to provide an adjustable control of the amplification resulting from the use of device 1053, either resistance 1063 or resistance 1076 of different values may be inserted in the cathode circuit by manipulating switch 1077 to thereby change the curvature of the line ABC in Figure 10.

The circuit thus far described in Figure 6 is useful in providing a rotating field in the tube 1014 (Figure 5) in order that the cathode beam 1013 may assume a direction corresponding to the direction in which the antenna beam is scanning at any particular moment. The circuit described presently in Figure 6 is useful in providing a sweep of the cathode ray beam from its adjusted electrical center to an upward position.

In order to provide an outward sweep of the beam 1013, the series of so-called "clamping and switching" tubes or so-called "double-ended" saw-tooth generators having the general reference numerals 1080, 1081, 1082 and 1083 are supplied with an electrical potential pulse represented by the rectangular-shaped wave 1084 from the MV gate generator 1017 each and every time a pulse of energy is transmitted from antenna 1010. As a result, the generators 1080, 1081, 1082 and 1083 cause saw-tooth shaped electrical waves represented by the waves 1086, 1087, 1088 and 1089 to be applied to the grids 1042, 1047, 1045 and 1046 respectively at the particular moment determined by the position of brushes 1036, 1039, 1037 and 1038 respectively.

Besides providing a saw-tooth wave, each of the units 1080, 1081, 1082 and 1083 are connected so as to assure the return of the cathode ray beam 1013 to its definite predetermined starting position from where it may again be swept outwardly upon the application of a succeeding pulse from gate generator 1017.

Each one of the units 1080, 1081, 1082 and 1083 are connected in the same fashion with reference to generator 1017 and corresponding control grids 1042, 1045, 1046 and 1047 function in the same manner, and for that reason a detailed description of the operation of the "double-ended" saw-tooth generator 1080 will suffice to explain the others, although it is noted at this time that means, described later, are provided for adjusting the bias potentials of units 1080 and 1083 to provide adjustable cathode beam adjusting means.

The "double-ended" saw-tooth generator 1080 has two electron discharge devices 1092, 1093 with their respective control grids 1094, 1095 each connected to the positive terminal of voltage source 1096 through voltage dropping resistance 1097. Anode 1098 of device 1093 is connected to the positive terminal or source 1096 while its associated cathode 1099 is connected not only to control grid 1042 through lead 1100 but also to anode 1101 of device 1092 whose cathode 1102 in turn is connected to lead 1104 of predetermined adjustable bias potential, lead 1104 being connected to the variable tap on voltage dividing potentiometer 1063 to provide adjustable horizontal beam centering. Connected between anode 1101 and ground is the serially connected condenser 1105 and resistance 1106 for developing a saw-tooth wave when a pulse 1084 is supplied from the MV gate generator 1017 to the control grid 1094 through the serially connected coupling condenser 1107.

In the absence of gating pulse 1084 applied to grids 1094 and 1095 as is the case in the interval between successive sweeps of the cathode ray beam, the two discharge devices 1092, 1093 conduct a relatively large amount of current since their grids 1094 and 1095 are positive and hence the potential of lead 1100 assumes substantially the predetermined potential of lead 1104; that is, the potential of lead 1100 is "clamped" to a predetermined potential during successive cathode ray beam sweeps; and hence the cathode ray beam returns to a definite predetermined point from where it may again start on a succeeding sweep.

However, at time T at the beginning of pulse 1084, the grids 1094 and 1095 are made sufficiently negative to cut off the flow of space current in both devices 1092 and 1093 with the result that potential of lead 1100 is no longer stabilized and condenser 1105 connected thereto begins to charge either positively or negatively depending upon the corresponding instantaneous potential of brush 1036 to thereby cause the potential of lead 1100 to rise in the manner indicated by the saw-tooth wave 1086.

Thus from the indicated time T to T' during the duration of gating pulse 1084, a saw-tooth voltage 1086 appears on lead 1100, but after time T' to the beginning of the succeeding pulse (the time between beam sweeps) the devices 1092 and 1093 again become conducting and the potential of lead 1100 is stabilized at a potential determined by the potential of lead 1104.

One of the important features of the present invention is that the sweep pattern of the cathode ray beam corresponding to a particular range is elliptical in shape in order to obtain the highly desirable unidirectional type of expansion mentioned previously; that is, referring to Figure 7, wherein the outer circle 1110 represents the outline of the cathode ray tube 1014 upon which is affixed thereto by mechanical means a landing strip pattern 1111 and the point 1112 represents both the geometrical center of the tube and the point from where radar pulses originate, instead of the locus of points of constant range being circles such as circles 1113, 1114, 1115, 1116 and 1117, the locus of points of constant range in accordance with the present invention fall on an ellipse, one of which is shown as ellipse E in Figure 7. Further, in accordance with the present invention, the ellipse E is the locus for points of the same range which would otherwise fall on the circle 1113 whose diameter corresponds to the minor axis of the ellipse. Preferably the ellipse eccentricity expressed in the ratio of the length of the major axis to the length of the minor axis is in the range of 3 to 1.

Preferably, such elliptical loci are obtained by making the amplification in electron discharge devices 1043 and 1053 much larger than the amplification in devices 1051 and 1052 to thereby apply larger sweep currents to the cathode ray tube deflecting coils 1022, 1023 than to the other deflecting coils 1024, 1025. Or, the coils 1022, 1023 may have a larger number of turns than the number of turns in coils 1024, 1025, or the so-called sine potentiometer 1040 may be modified in such a manner so as to produce a desired elliptical sweep pattern on the cathode ray tube; or, condenser 1105 and resistance 1106 may be altered to increase or decrease the slope of the sloping portion of the voltage wave 1086.

Preferably, as shown in Figure 9, the electrical center 1112 is adjusted to be near the outer edge of the cathode ray scope by adjustment of the taps on potentiometers 1068 and 1070 to thereby make more efficient use of the viewing screen 1014 of the cathode ray tube. Figure 9 further shows the air-strip pattern 1111 placed by mechanical means onto the face of the tube, lines 1120, 1121 defining the extreme limits of the cathode ray beam sweep and ellipses 1122, 1123, 1124, 1125, etc., defining loci of points of constant range.

It is thus apparent that when and as the antenna beam is caused to scan the landing strip and the air approach path thereto and when an aircraft is in such approach path, a so-called echo signal from the aircraft will be intercepted by the radar receiver 1015 and then applied in modified form to the cathode ray control electrode 1016 to cause intensification of the cathode ray tube screen to thereby indicate by such intensification the location of the aircraft. Inasmuch as the sweep path of the cathode ray beam has an elliptical pattern of such nature to cause unidirectional expansion or magnification only in the direction of the width of the landing strip, an aircraft flying in a straight path will be reproduced on the cathode ray tube as flying in a corresponding substantially straight line and, because of the unidirectional magnification, its exact position with respect to the center of the landing strip may be obtained accurately.

Inasmuch as the cathode ray sweeps produce a representation in the form of a relatively small sector of a circle, it is evident that one of the four deflecting coils 1022, 1023, 1024 and 1025 may be omitted and a simple choke coil of the same impedance substituted therefor so that the cathode ray beam may be conveniently centered in the same manner as before the substitution.

One of the important features of the present invention is that the image of the aircraft on the cathode ray tube screen becomes progressively smaller when and as the aircraft approaches its landing strip as indicated by the series of images R in Figure 10. This feature is of course desirable since it allows an observer to accurately locate the center of the aircraft with respect to the center of the landing strip and the predetermined safe straight line glide path.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In combination, means arranged to produce and to scan into space a radiated beam of electromagnetic wave energy pulses, means arranged to produce a cathode ray beam having a normal position, means arranged to sweep said beam outwardly from said normal position in timed relation with said energy pulses to thereby produce a synchronized cathode ray sweep, means arranged to rotate said cathode ray sweep about a central original position in timed relation with scanning of said radiated beam with each of said sweeps to thereby produce a two-dimensional representation, means including and operating synchronously with the last mentioned means for varying the length of the sweep in accordance with its particular angular position, while maintaining the time duration of the sweep substantially constant to thereby produce unidirectional expansion in azimuth of said two-dimensional representation, said radiated beam producing means including means arranged to produce a radiated beam which is unsymmetrical about the axis in which its intensity is greatest, with such beam having a characteristic unsymmetrical portion thereof extending transversely to said axis and extending generally transversely to the direction in which said representation is unidirectionally expanded.

2. In an object locating system of the type in which an exploratory sharply directive pulsed energy beam is turned to scan an area, reflections of said beam from objects within said area are received, and a pattern of indications is obtained on an indicator in which pattern each object is represented by an indication at an angle from a center point corresponding to its azimuth angle with respect to the position of the exploratory means and at a distance from said center point which is proportional to the object's distance from said exploratory means, means for expanding a portion of said pattern which includes means for displacing the center point of said pattern from the center point of the indicator, and means for expanding the azimuthal sweep of said indicating means without appreciably expanding its range sweep, whereby a desired portion of said pattern is unidirectionally expanded to provide a more detailed view thereof, said azimuthal sweep expanding means including means for varying the length of the azimuthal sweep in accordance with its particular angular position, while maintaining the time duration of said sweep substantially constant and means arranged to render said beam unsymmetrical about the axis in which its intensity is greatest with such beam having a characteristic unsymmetrical portion thereof extending transversely to said axis and extending generally transversely to the direction in which said representation is unidirectionally expanded.

3. The arrangement of claim 2 and means for oscillating the exploratory beam of said system through that portion of a complete revolution only for which an expanded pattern is desired.

4. In a ground controlled approach system wherein it is desirable to ascertain the position of an approaching plane as the plane travels through the approach zone extending up to touchdown on a landing strip, the combination comprising, means arranged to scan into space a beam of electromagnetic wave energy pulses, means arranged to produce a cathode ray beam having a normal central original position, means arranged to sweep said beam outwardly from said normal position in timed relation with said energy pulses to thereby produce a synchronized cathode ray sweep, means arranged to rotate said cathode ray sweep about said central position in timed relation with scanning of said beam to thereby produce a two-dimensional representation, means including and operating synchronously with the last mentioned means for varying the length of said sweep in accordance with the particular corresponding angular positions of said sweep to produce unidirectional expansion of said two-dimensional representation in azimuth wherein distances corresponding to azimuthal variations are magnified with respect to distances in quadrature thereto corresponding to range variations, said scanning means including a precision type of antenna, said antenna comprising an arrangement of dipole antennae, a variable cross-section wave guide into which each one of said dipoles extends to extract energy therefrom, a half parabolic reflector mounted adjacent said arrangement, a supplementary reflector mounted on said parabolic antenna, variations of the cross-section of said wave guide resulting in scanning of said beam of electromagnetic wave energy pulses in an azimuthal direction with respect to said landing strip, and said supplementary reflector being mounted on said parabolic reflector to modify the distribution of energy which is otherwise radiated by said parabolic reflector into only a fractional portion of said approach zone so that such energy is radiated throughout the entire approach zone and in the direction of said air strip.

5. In combination, means arranged to produce a cathode ray beam, means for scanning a predetermined area in space, means acting upon said beam in synchronism with said scanning means to move said beam to produce radial sweeps, with different ones of said sweeps being produced by said beam traveling at different speeds, to form a two-dimensional azimuthal-range representation of said area, said last-mentioned means including means for varying the speed of cathode ray beam travel in different sweeps in accordance with the particular angular position of the sweeps to produce unidirectional expansion in azimuth in said representation, wherein distance corresponding to azimuthal variations are magnified with respect to distances in quadrature thereto corresponding to range variations, said scanning means including means for projecting a sharply directed beam extending unsymmetrically about the axis in which its intensity is greatest with a characteristic portion extending transversely of said axis and extending generally transversely to the direction in which said representation is unidirectionally expanded.

6. In and for use in a ground controlled approach system wherein it is desirable to ascertain the position of an approaching plane as the plane travels through the approach zone extending up to touchdown on a landing strip, the combination comprising, means arranged to scan into space a beam of electromagnetic wave energy pulses, said scanning means including: a precision type of antenna, said antenna comprising an arrangement of dipole antennae, a variable cross section wave guide into which each of said dipoles extends to extract energy therefrom, a half parabolic reflector mounted adjacent said arrangement, a supplementary reflector mounted on said parabolic antenna, means whereby variations of the cross section of said wave guide results in scanning of said beam of electromagnetic wave energy pulses in said approach zone, said supplementary reflector being mounted on said parabolic reflector to modify the distribution of energy which is otherwise radiated by said parabolic reflector into only a fractional portion of said approach zone so that such energy is radiated throughout the entire approach zone, said supplementary reflector serving to produce said beam which is unsymmetrical about the axis in which its intensity is greatest, with such beam having a characteristic unsymmetrical portion thereof extending transversely to said axis and extending generally in the direction of said landing strip, and means for mounting said supplementary reflector on said parabolic reflector at varying distances thereon from said arrangement of dipole antennae whereby said scanning means may function properly when mounted on either side of said landing strip.

7. The arrangement set forth in claim 6 in which a parasitic antenna is mounted stationarily with respect to said parabolic antenna with the arrangement of dipole antennae disposed between the supplementary reflector and the parasitic reflector.

8. The arrangement set forth in claim 6 in which said supplementary reflector comprises a metallic bar extending generally parallel with the longitudinal axis of the parabolic reflector and mounted on the focus side thereof.

9. In and for use in a ground controlled approach system wherein it is desirable to ascertain the position of an approaching plane as the plane travels through the approach zone extending up to touchdown on a landing strip, the combination comprising, means arranged to scan into space a beam of electromagnetic wave energy pulses, said scanning means including a precision type of antenna, said antenna comprising an arrangement of dipole antennae extending generally along a straight line, a variable cross section wave guide into which each of said dipoles extend to extract energy therefrom, a half cylindrical type parabolic reflector mounted adjacent said arrangement, a supplementary reflector mounted on said parabolic reflector, means whereby variations of the cross section of said wave guide results in scanning of said beam of electromagnetic wave energy pulses in an azimuthal direction with respect to said landing strip, said supplementary reflector being mounted on said parabolic reflector to modify the distribution of energy which is otherwise radiated by said parabolic reflector into only a fractional part of said approach zone so that said energy is radiated throughout the entire approach zone, said supplementary reflector comprising a bar extending generally parallel with the axis of said cylindrical type parabolic reflector and mounted on the focus side thereof and serving to render said beam unsymmetrical about the axis in which its intensity is greatest with a characteristic unsymmetrical portion thereof extending in the direction of said landing strip.

10. In an object locating system of the type in which an exploratory sharply directive pulsed energy beam is turned to scan an approach zone to an aircraft landing field, reflections of said beam from objects within said area are received, and a pattern of indications is obtained on an indicator in which pattern each object is represented by an indication at an angle from a center point corresponding to its angle with respect to the position of the exploratory means and at a distance from said center point which is proportional to the object's distance from said exploratory means, means for producing and oscillating the exploratory beam of said system through that portion of a complete revolution only for which an expanded pattern is desired, means for expanding a portion of said pattern which includes means for displacing the center point of said pattern from the center point of the indicator, said indicator including a pair of control means, means energizing each of said pair of control means substantially simultaneously with a corresponding train of waves of substantially constant intensity appearing recurrently in timed relationship with production of said pulsed energy beam, means deriving a voltage varying in magnitude in accordance with the particular angular position of said pulsed energy beam, means modulating one of said trains of waves with said voltage in an amount substantially greater than the other train of waves, whereby a portion of said pattern is expanded to provide a more detailed view thereof in a unilateral expanded representation wherein distances corresponding to azimuthal variations are magnified with respect to distances in quadrature thereto corresponding to range variations, said exploratory beam producing means comprising: a parabolic reflector, a supplementary reflector mounted on the focus side of said parabolic reflector and effective to redistribute the energy, otherwise radiated into a fractional portion of the approach zone only, so that the entire approach zone is covered, said supplementary reflector serving to modify said exploratory beam such that it has a characteristic unsymmetrical portion thereof extending transversely to the axis in which its intensity is greatest and extending generally transversely to the direction in which said representation is unilaterally expanded.

References Cited in the file of this patent

UNITED STATES PATENTS

| 2,156,653 | Ilberg | May 2, 1939 |
| 2,271,300 | Lindenblad | Jan. 27, 1942 |
| 2,421,747 | Englehardt | June 10, 1947 |
| 2,426,189 | Espenschied | Aug. 26, 1947 |
| 2,436,408 | Tawney | Feb. 24, 1948 |
| 2,440,250 | Deloraine | Apr. 27, 1948 |
| 2,452,349 | Becker | Oct. 26, 1948 |
| 2,470,016 | Clapp | May 10, 1949 |
| 2,480,143 | Lanxner | Aug. 30, 1949 |
| 2,480,208 | Alvarez | Aug. 30, 1949 |
| 2,489,865 | Cutler | Nov. 29, 1949 |
| 2,512,147 | Gardner | June 20, 1950 |
| 2,521,844 | Gordy | Sept. 12, 1950 |
| 2,585,855 | Sherwin et al. | Feb. 12, 1952 |

FOREIGN PATENTS

| 586,689 | Great Britain | Mar. 27, 1947 |
| 588,851 | Great Britain | June 4, 1947 |
| 599,572 | Great Britain | Mar. 16, 1948 |
| 604,257 | Great Britain | June 30, 1948 |
| 668,231 | Germany | Nov. 3, 1938 |

OTHER REFERENCES

Radar System Engineering 1, June 23, 1947, by Ridenour, Radiation Laboratory Series (pp. 291 through 294) (McGraw-Hill, pub.).

Journal of Institution of Electrical Engineers, May 1946, vol. 93, part III–A, No. 4, pp. 693 and 697.